POWER TRAIN USING MULTIPLE POWER SOURCES

Filed March 17, 1969

Baruch Berman
George H. Gelb
Neal A. Richardson
Tsih C. Wang
INVENTORS

BY

ATTORNEY

Baruch Berman
George H. Gelb
Neal A. Richardson
Tsih C. Wang

INVENTORS

BY [signature]

ATTORNEY

POWER TRAIN USING MULTIPLE POWER SOURCES

Baruch Berman
George H. Gelb
Neal A. Richardson
Tsih C. Wang
INVENTORS
BY
ATTORNEY March 2, 1971 B. BERMAN ET AL 3,566,717
POWER TRAIN USING MULTIPLE POWER SOURCES
Filed March 17, 1969 4 Sheets-Sheet 4

Baruch Berman
George H. Gelb
Neal A Richardson
Tsih C. Wang
INVENTORS

BY

ATTORNEY 3,566,717
POWER TRAIN USING MULTIPLE POWER SOURCES

Baruch Berman, Palos Verdes Peninsula, George Howard Gelb, Torrance, Neal Allen Richardson, Palos Verdes Peninsula, and Tsih C. Wang, Santa Monica, Calif.; said Wang assignor to TRW Inc., Redondo Beach, Calif.
Filed Mar. 17, 1969, Ser. No. 807,870
Int. Cl. B60k *1/04, 21/08;* F16h *37/00*
U.S. Cl. 74—859 40 Claims

ABSTRACT OF THE DISCLOSURE

A power train is described which is comprised of a prime mover, two power converters, an epicyclic gear train, an energy storage device and associated control systems. In the preferred embodiment, the prime mover, an internal combustion engine, typically supplies power to the gear train which apportions mechanical power to one of the power converters—an electrical generator—or to the output shaft of the power train. Power from the generator is delivered to either or both the energy storage device, a battery, and the second power converter, an electrical motor-generator which is dynamically coupled to the output shaft.

The power train may be operated in one of two modes, in the first, the internal combustion engine runs at constant speed and relatively constant low power. Engine operation of this nature allows the use of small displacement engines burning lean fuel-air mixtures, thereby reducing engine exhaust emissions. Engine power output control in the first mode is accomplished by changing the loading of the generator on the engine in a feedback control manner. The motor-generator is controlled by the operator who uses a system which controls the flow of power from the generator and/or battery combination to the motor or the flow of power from the motor-generator to the battery. In the second mode of operation, all engine power is mechanically directed to the output shaft and the engine operates in a variable throttle manner. As in the first mode, output shaft peak power demands are satisfied by drawing power from the battery and therefore the engine throttle excursions are minimized. Excess engine power and regenerative power due to external forces acting on the output shaft can be transformed in the second power converter for storage in the energy storage device.

In either mode, it is possible to vary the power settings of the engine slowly to reflect the mean power demand on the power train. Typically the state of battery charge would be used as the control variable.

BACKGROUND OF INVENTION

(1) Field of the invention

This invention is related to mechanical power transmissions and in particular relates to uses within ground transportation vehicles such as personal or mass transit vehicles.

(2) Discussion of the prior art

The most widely used form of transportation in the world today is based on the use of internal combustion engines as the prime mover of ground transportation vehicles. Such engines are controlled by a throttle which varies the amount of fuel and air metered to the engine typically through a carburetor. The nature of the internal combustion engine fuel-burning process is such that products of incomplete combustion are generally admitted to the air. In addition to this basic engine problem, engine throttling is an inherently inefficient process, particularly at light load. Quick engine power response requires fuel-air mixture enrichment, thus adding to unburnt product emissions. All of these factors are particularly important in large cities where start-and-stop driving is common and where pollution is of major concern.

A number of patents have been issued describing vehicles which contain power trains composed of an internal combustion engine, an electric traction motor, a generator, a battery, and mechanical gear transmission. Various power train configurations using some or all of the components are seen in the U.S. patents to Ahlm, Nos. 1,515,-322 and 1,780,150. It is noted, however, that in these patents one of the generators or dynamos is rigidly connected to the internal combustion engine and that no battery is provided.

Another example is seen in the patent to Kimura, U.S. Pat. No. 1,671,033. However, the control system differs markedly from that of the instant invention and in addition there is no load control over the engine.

In the U.S. patent to Thompson, No. 1,870,076, no battery is provided and there is no control over the internal combustion engine.

Other patents related to the use of internal combustion engines and generator motors are listed as follows: Higby 2,004,465, Weston 1,909,792, Trofinou 2,384,776, Imelmann 3,171,505, Landers 3,205,966, Roe 3,161,083, Riley et al. 2,523,143, Hastings, Jr. 3,134,063, Dannettell 3,243,-681, Stamm 3,249,836, Dannettell 3,349,309, and Holcombe 3,356,171.

SUMMARY OF INVENTION

The invention can be generalized as the combination of a prime mover, typically an internal combustion engine, an appropriate mechanical gear train, an energy storage device(s) or accumulator(s)—typically a battery, a power converter—typically a generator, capable of converting prime mover power into a form suitable for storage in the storage device and/or delivering the power to a second power converter—typically a motor-generator—capable of transforming the said generated or stored energy into propulsive effort at the output shaft. The second converter is also capable of performing a generator function by which it transforms mechanical power available at the output shaft into a form suitable for storage in the energy storage device. The generator is hereinafter referred to as a speeder while the motor-generator is herein referred to as a torquer.

Various control systems are provided to control the flow of power from the various power sources and converters; their function depends on the mode of power train operation at that time. In the first mode of operation the prime mover operates at low power, constant torque and speed and a speeder controller changes the generator (speeder) loading to control the steady-state of the prime mover. A torquer controller varies both the direction and magnitude of power flow through the torquer.

During the second mode, speeder operation ceases, and all prime mover energy is available directly at the output shaft. In addition the engine power can be varied and the function of the torquer controller is expanded to include prime mover power control.

In either mode an override control is provided to slowly change the engine power settings. In the first mode this variation is used to match the engine power to the average power required at the output shaft. In the second mode, power changes insure that the battery stays near a high state of charge.

DESCRIPTION OF PREFERRED EMBODIMENTS

First mode operation

Figure 1:
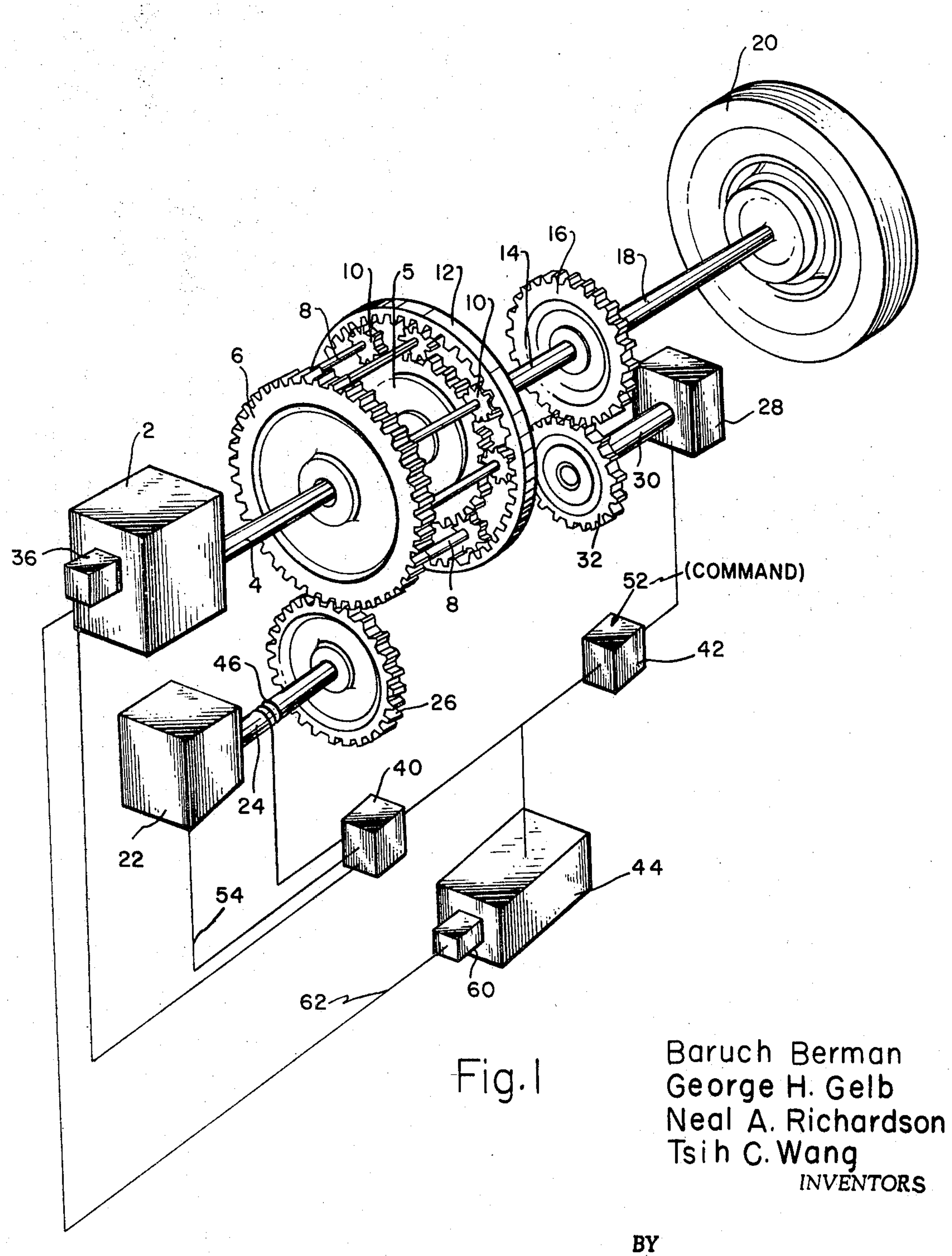
FIG. 1 is a schematic and perspective view of the one embodiment of this invention.

Referring now to FIG. 1, a prime mover, which in the preferred embodiment is an internal combustion engine, is shown schematically at 2. This prime mover rotates shaft 4 which passes through planet carrier 6 and drives sun gear 5. It is possible to interpose addition transmission elements such as gear trains, clutches and couplings between shaft 4 and gear 5 to accomplish speed changes or reversing. Such devices are not shown in order to simplify FIG. 1. Planet carrier 6 has associated therewith shafts 8 which are connected to planet gears 10. These planet gears rotate on shafts 8 within ring gear 12. Ring gear 12 drives shaft 14, gear 16 and shaft 18. Shaft 18, the output shaft, is shown directly driving drive wheel 20. Instead of directly coupling shaft 18 to wheel 20, a conventional automotive differential gear system may be interposed, but has been omitted for purposes of simplicity. An electric generator 22 is shown in schematic form and is driven by shaft 24 and gear 26 which is directly and dynamically coupled to planet carrier 6.

An electric motor-generator 28 is coupled by means of shaft 30 to gear 32 which is dynamically coupled to gear 16. The connection between motor-generator 28 and gear 16 may be through various transmission elements as described above. Generator 22 is hereinafter referred to as a "speeder" and electric motor-generator 28 is referred to as a "torquer." A sensing device 36 is provided which senses the speed of prime mover 2 and conveys this signal to speeder controller 40.

A torquer controller 42 is shown schematically which controls the energy transfer between the parallel connected combination of the energy storage device—battery 44—speeder 22 and torquer 28. The torquer controller and the speeder controller operation will be explained as this description proceeds but for simplicity the circuit diagrams are omitted from FIG. 1. Also shown in FIG. 1 is a brake 46 which is controlled by the speeder controller 40.

The engine-produced torque on sun gear 5 produces torque on ring gear 12 and planet carrier 6 which are related to the torque on gear 5 by algebraic relationships involving the gear ratio between gears 12 and 5. In addition the speeds of gear 12 and gear 6 are algebraically related to the speed of gear 5 through the gear ratio between gears 12 and 5.

Thus, if gear 5 is driven at constant speed and torque, the torque on gears 12 and 6 are constant, while the speed relationship between gears 12 and 6 can vary subject to satisfying the kinematic gear relationships. For example, if gear 12 is not rotating, gear 6 will turn at its maximum speed; as gear 12 beings to rotate the speed of gear 6 will decrease. Since the torques delivered to gears 12 and 6 bear constant relationship to the engine torque, the power delivered through gears 12 and 6 will be in direct relation to their respective speeds. If the torque required on shaft 18 is greater than the torque associated with gear 12, the operator, acting through torquer controller 42, signals the torquer 28 to increase its torque output thereby to act through gears 32 and 16 to augment the torque on shaft 18. In such a circumstance the torquer acts as a motor and will receive electrical energy from battery 44 and/or speeder 22.

Conversely, if the torque on shaft 18 resulting from engine-produced torque on gear 12 is greater than required, the operator acting through torquer controller 42 signals torquer 28 to absorb power through gears 32 and 16 and to deliver it to battery 44. In such circumstances the torquer acts as a generator.

A feature of speeder 22 operation is to provide a reaction torque acting through gears 26 and 6 so as to maintain the operating state of engine 2. Since engine 2 operates at constant throttle and thus at essentially constant torque, it is necessary that speeder 22 act essentially as a constant torquer, variable speed generator. For example, if the engine speed decreases, sensor 36 will detect the speed change and will cause the electromagnetic torque of speeder 22 to decrease thus placing a lighter load on the engine. Reducing the load will cause the engine to increase its speed thereby re-establishing the desired engine condition. In a converse manner increases in engine speed cause an increase in speeder loading thereby causing a reduction in engine speed.

From the above it becomes clear that speeder 22 maintains the speed of engine 2, thereby giving rise to its name. In a similar way it is clear that the function of torquer 28 is to add to or to subtract from the engine-produced torque delivered to shaft 18 thereby giving rise to its name. It is to be noted that the power output of speeder 22 varies directly with its speed, neglecting torque loading perturbations, and that this power output is delivered to battery 44 for storage and/or for traction use when torquer 28 acts as a motor. The power absorbed or generated by torquer 28 varies with both its speed and torque level; however, none of its output is supplied to speeder 22.

It is also clear that the transmission as described above allows power to flow to and from shaft 18 in several ways as will now be enumerated. First, engine power can be delivered mechanically directly to the output shaft 18 through the planetary gear train. Second, engine power can be converted in the speeder 22 to another energy form—electrical energy in the present description—and then delivered to torquer 28 where it is reconverted back to mechanical energy with a different torque-speed relationship than was available from the engine. A third path involves the flow of power from the engine through the speeder where it is converted into electrical form. This energy is then stored in the battery and subsequently used in the torquer. A fourth power path contains the flow of engine power through the planetary system to shaft 14 and then through gears 16 and 32 to torquer 28, which, acting in the generator mode, converts the mechanical energy to electrical energy for battery charging. The final path allows mechanical power from wheel 20 to flow as just described through gears 16 and 32 to torquer 28 where conversion takes place with subsequent energy storage in the battery. This last mode may be termed regenerative braking. It is also possible to dissipate the regenerated power coming from torquer 28 in various ways, for example, resistive elements. This form of regenerative braking is termed dynamic braking.

Both regenrative and dynamic braking can be used in conjunction with advanced automatic braking systems; for example, antiskid vehicle braking devices can be incorporated into the power train which sense wheel breakaway (skid) conditions and control the rate of braking effort.

Second mode operation

As the speed of shaft 18 increases from rest it reaches a predetermined speed, hereinafter called mode transition speed, wherein the kinematics of the planetary gear train are such that the speed of speeder 22 approaches zero. At mode transition speed, brake 46 is applied upon signal from speeder control 40 to prevent further rotation of the speeder shaft 24 and planet carrier 6 in a reverse direction. At the same time speeder 22 is electrically disconnected from the power flow path. Brake 46 therein-after provides the required reaction torque on the planetary gear train so that all engine power is directly transferred to the ring gear 12, and hence to the output shaft 18. When the speed of shaft 18 falls below the mode transition speed, brake 46 is released and the speeder 22 is electrically reconnected.

Above the mode transition speed, the engine, which is now directly coupled to the output shaft 18, must run a speed directly proportional to the output shaft speed. In this operating regime the operator will, in addition to controlling the sense and magnitude of the torquer torque, actuate and control a throttle on the engine, thereby controlling that device's power output.

Thus, when wheel 20 is running above the mode transition speed, both torquer 28 and engine 2 will share the power requirements of wheel 20. The load sharing logic is provided by elements of torquer controller 42 which apportions the output shaft power demands between the engine and the torquer. It is emphasized that when operating above mode transition speed power flowing from either the engine or wheel 20 can still be converted in torquer 28 for storage in the battery as described previously.

Engine power level override

It is desirable in vehicle applications to match the output power level of the engine to the average power demand at wheel 20, leaving the battery to produce or to absorb rapid propulsion power variations. As the average road power demand varies over a suitable time duration, the engine power should be adjusted to reflect that variation. In the present description stored energy sensor 60 is connected to a throttle actuator on the engine 2 as shown by the line 62. Thus, as the battery energy level falls, reflecting the need for greater engine power, a signal is conveyed from sensor 60 to the engine throttle actuator to increase the engine power output. When the power output of the engine is greater than the average road power demand and the battery 44 approaches a fully charged state, sensor 60 acts to throttle back the engine power. This override feature can be applied during both the first and second modes of operation. In addition, other sensor forms relating average road demand to engine power demand can be used.

Advantages of this power train over other vehicle power trains

The power train using multiple power sources has several advantages over present all-mechanical power trains when applied to vehicle applications. It is emphasized that the mode transition speed could be selected to correspond to the upper boundary of vehicle speeds in an urban environment, for example, the maximum legal speed. Thus most of the time during urban operation (below mode transition) the power train would be in its first mode and the internal combustion engine would operate at quasi-constant speed and torque. Operating in this manner, the engine can be run at high air-fuel mixture ratios insuring high combustion efficiency and low engine emissions. Fuel enrichment devices such as an acceleration pump on the carburetor to handle rapid power and speed increases also are not required. Because the energy storage system is used to provide power peaks, the engine can be run at a power setting associated with the average road power demand. In both operating modes the engine power would reflect smaller power output demands than is normally encountered thereby allowing the use of smaller engines.

The power train has distinct advantages when compared to alternative ways of arranging the major components. Since the speeder handles only the difference between the total engine output power and that portion of engine power delivered directly to the ring gear 12, and because the engine power output is low while the speeder is in operation, the size of the speeder can be smaller than required in proposed power trains where the engine directly drives and generator and all engine power must be handled by the generator. Similarly, the size of the torquer can be reduced below that of a power train in which all propulsive power must flow through the traction motor.

Torquer control

The description of the torquer control system is presented in terms of vehicle propulsion use; however, the control functions and operational characteristics may readily be applied to other applications wherein controlled torque and power levels are required.

The primary functions of the torquer are (1) *to supply additional torque to the output shaft* upon demand as when desired for acceleration, maintenance of abnormally high velocities, up-slope travel, or the like, and (2) *to derive power from the output shaft* as from deceleration operations, down-slope travel, or excess from the engine. Thusly, it may be considered that the torquer, upon command from the torquer control, operates the energy storage selectively in a motor mode to couple power from the power-train generator (speeder) and/or apparatus to the wheels or in a generator mode to couple excess drive shaft power to the energy storage device.

Figure 2:
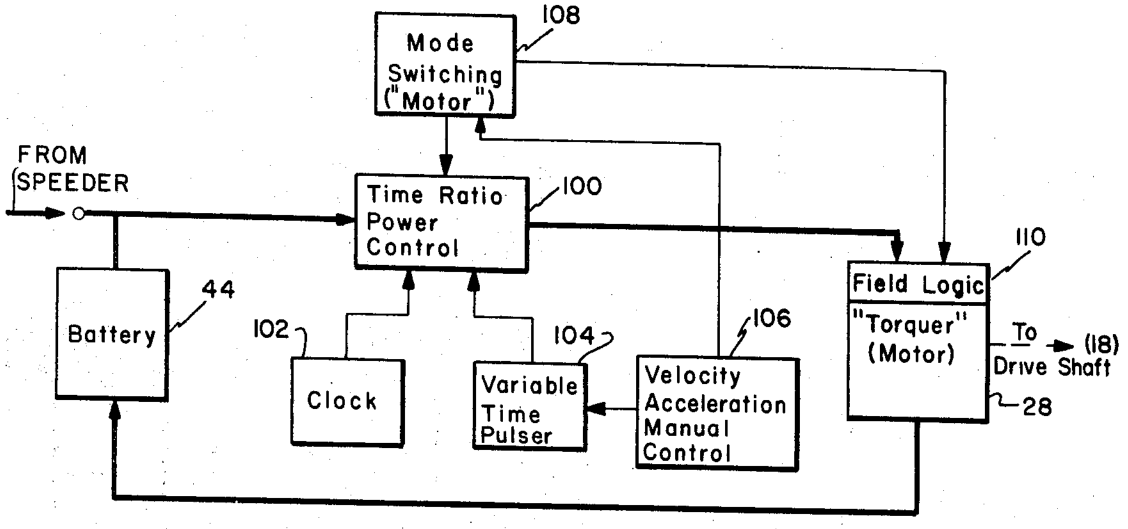
FIG. 2 is an electrical block diagram illustrating a first mode of operation.

Referring to FIG. 2, a highly simplified block diagram of an example of a torquer, torquer control, generator (speeder) and its control system to be described later, and storage apparatus constructed in accordance with the principles and structural concepts of the invention, is presented in a motor mode as for delivering electrical power from a generator (speeder 22) and/or a battery 44 to the torquer [motor] 28 wherein the electrical power is converted to mechanical power and coupled to the output shaft 18. In this mode, the torquer speeder and battery are effectively coupled in a loop with a time ratio power control switch 100 interposed therewith. The magnitude of power transferred through the switch 100 is determined on a variable duty cycle basis. The switch is closed in a power transfer relation for at least a portion of each cycle of the constant frequency clock pulser 102 while the variable time pulser 104 determines a time magnitude during each cycle during which the switch 100 is open, in a power flow blocking relation. The ratio of the "on" time to the period of each cycle is the duty cycle of the power control; and the greater the ratio, up to 100%, the more nearly the time ratio power control switch is a short circuit providing maximum coupling of all available power from the battery-speeder controller combination to the torquer [motor] 28. Conversely, as the "off" time approaches 100%, the more nearly the switch becomes an open circuit blocking all electrical power to the motor.

The variable time pulser 104 is controlled by a plurality of signals, as will be discussed below; however, the chief control input is from the operator through the velocity/acceleration manual control 106. In a typical example of the invention, the control 106 is a foot-operated pedal the position of which, with respect to the cockpit floorboard, electrically controls the "off" time pulse length of the variable pulser 104.

Also to be explained in detail below is the smooth digital control of the mode switching network 108 by the physical position of the manual control 106. Typically, for example, the upper positions of the manual control 106 causes the mode switching network 108 to set a "regenerative" mode of operation for the torquer field logic 110 and other torquer controls and may effectively create a variable braking effect, while the lower positions of the foot pedal set the motor mode indicated in FIG. 2. In summary, the center position of the foot pedal constitutes an "off" state for the system; upper positions create a regeneration mode of variable effect; the lower portions achieve a motor mode of variable power transfer from the battery speeder controller combination; and the extreme lower, "floored," position may be used to short out (by-pass) the power control switch 100 and deliver all available power to the motor as for passing or other emergency needs.

Figure 3:
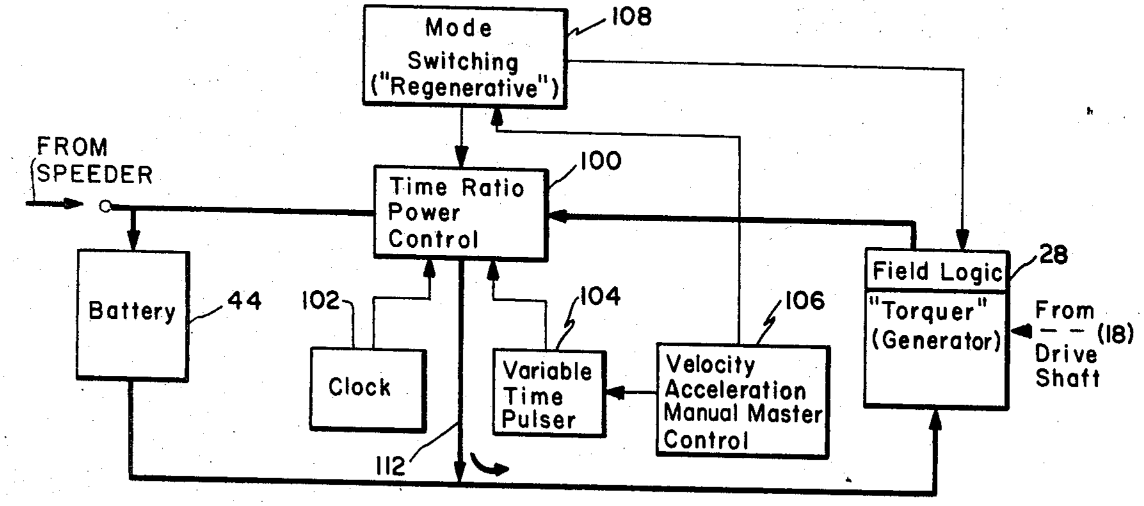
FIG. 3 is a diagram similar to that of FIG. 2 useful in describing a second mode of operation.

Referring to FIG. 3, the highly simplified block diagram of FIG. 2 is essentially repeated in, however, a regenerative mode by which power from the output shaft 18 in the form of undesired road velocity or excess power from the engine is coupled to the torquer [generator] 28 to charge the battery or achieve electrical braking effects, as desired. Again, the master manual control 106, or typically, foot pedal, controls the mode of operation, i.e., acceleration, deceleration, coasting, or the like, and the magnitude of the duty cycle control achieved by the time ratio power control switch 100. As indicated, the mode shown is "regenerative" causing the torquer and its field logic to function as a generator driven by the output shaft 18 and causing the time ratio control switch to couple electrical charge into the storage battery 44 or electrical dissipative elements as in a dynamic braking mode in accordance with a duty cycle determined by, primarily, the master control 106.

Again, the clock pulser 102 and the variable time pulser 104, the latter being controlled by the master control 106, in turn control the time per cycle magnitude of the electrical coupling of the generator to the battery. In this mode, however, a portion of the power available from the generator is shorted back therethrough along the bus 112. This feature of the invention, as discussed below, creates a dynamic energy or current storage phenomenon in the inductance of the generator, or elsewhere in the circuit, which is utilized to create a higher-than-battery voltage thusly enabling a direct battery charging from the generator. It may also be noted that in this mode, electromagnetic braking may be desirably achieved automatically as determined by the disposition of the master control. The cooperation of the generating and motor effects of the speeder and the torquer are distinguished and discussed below.

Figure 4:
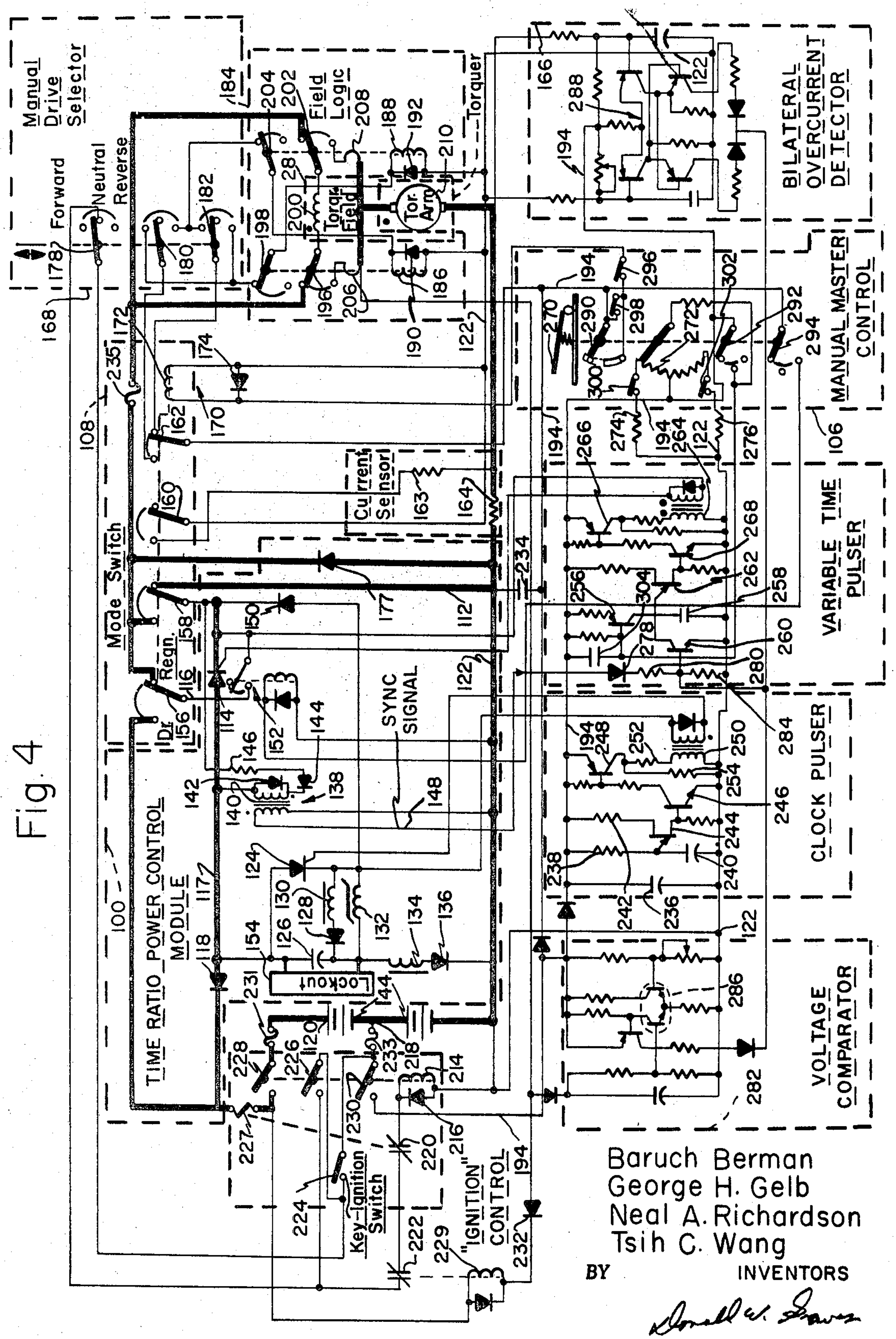
FIG. 4 is a schematic diagram illustrating an example of torquer and torquer controller apparatus and network constructed in accordance with the principles of the present invention.

Referring to FIG. 4, a more detailed example of a torquer 28, torquer controller 42, and battery 44 combination in accordance with the principles of the invention is illustrated.

The presentation of FIG. 4 is largely schematic in nature but includes dashed outlines to indicate certain major components some of which relate at least in part to the "blocks" of the previous figures. It is emphasized, however, that although like reference numerals are used to indicate some similarity of overall function, the elements of the particular selected example of FIG. 4 do not necessarily relate in a one-to-one manner with those of the previous figures. Moreover, it is stressed that the particulars shown in any of the figures are by way of example only and for purposes of illustrative discussion only and are presented in each case in the case of providing what is believed to be the most useful and readily understood description of the principles and structural concepts of the invention. In this regard, no attempt is made to show structural details or discuss operational aspects of the apparatus in more detail than is necessary for a fundamental understanding of the invention. The description taken with the drawings will make it apparent to those skilled in the automotive and electric power arts how the several forms of the invention may be *specifically* embodied in practice. *Specifically,* the detailed showing is not to be taken as a limitation upon the scope of the invention which is defined by the appended claims forming, along with the drawings, a part of this specification.

In the figure, the time ratio power control module or switch 100 is seen to include, in this example, a power transmissive silicon controlled rectifier (SCR) 114 whose anode electrode is coupled to the mode switch 108 by a power lead 116 and, by a power lead 117, through a diode 118 to the positive terminal 120 of the battery 44. The negative terminal of the battery is connected to a ground bus 122. The anode of a commutating SCR 124 and one terminal of a commutating capacitor 126 are also connected to the lead 117. The cathode of the SCR 124 and the other terminal of the commutating capacitor 126 are interconnected by a parallel pair consisting of a serially connected blocking diode 128 and commutating linear inductor 130 and a commutating saturable inductor 132. The same terminal of the capacitor 126 is also connected to the ground bus 122 by a serially coupled charging reactor 134 and blocking diode 136.

A synchronizer pulse generator 138 is shown included within the block envelope of the power control module 100 and comprises a pulse transformer 140 the primary winding of which is shunted by a diode 142 and connected serially with a diode 144 and a resistor 146 across the power SCR 114. The secondary winding is, with reverse polarity, connected between the ground bus 122 and a synch signal output lead 148. Also connected across the power SCR 114 is a foot pedal actuated override relay 152.

A blocking diode 150 is connected between the cathodes of the power SCR 114 and the commutating SCR 124. A lockout network 154 is shown connected across the commutating capacitor 126 and functions to prevent operation of clock and variable time pulsers 102, 104 whenever the voltage across the capacitor 126 is less than a predetermined magnitude.

The mode switch 108, is, in this example, a ganged series of four electro-magnetically actuated transfer switches 156, 158, 160, 162. In "drive" mode the switch 156 couples the anode of the power SCR 114 to the battery terminal 120; and in "regenerative" mode, to the torquer field. Similarly, the transfer switch 158 connects the cathode of the power SCR 114 either to the torquer field or, via the bus 112, to the return bus 122. The switch 160, in "drive" mode partially shorts out, via a shunt resistor 163, an armature current sensor resistor 164 to reduce the sensitivity of the bilateral overcurrent detector network 166 during "drive" operation. The switch 162 channels programming coil current to the manual drive selector control 168 for determining selectively the sense of torque or generated current associated with the torquer 28 with respect to "forward" or "reverse" vehicle velocities. The electromagnetic actuator 170 for the mode switch 108 is a coil 172 bypassed by a diode 174. One terminal is connected to the ground bus 122 and the other is coupled by a lead 176 to the manual master control 106.

The power bus to the torquer field is also connected to the cathode of a flyback diode 177 whose anode is returned to the ground bus 122.

The manual drive selector 168 is essentially conventional in construction and is a manually actuated ganged set of three switches 178, 180, 182. The switch 178 is a part of the "ignition" enabling circuit while the switches 180, 182 channel, as indicated above, selected senses of actuator currents through the field logic 184 programming coils 186, 188 of relays controlling the torquer 28. The three possible positions or states of the selector 168 are, as indicated, "forward," "neutral," and "reverse." Each of the programming coils is bypassed by a diode 190, 192 and has a terminal returned to the ground bus 122 while the current source for the coils is the B+ bus 194.

The programming coil 186 magnetically operates a ganged pair of switches 196, 198 which are shown in the figure in their state with no actuating current in the coil 186. The switch 196 controls direction of power current (drive or regenerative) through the torquer field winding 200, while the switch 198 controls actuation of the cooperating, opposite programming coil 188. Similarly, the latter coil operates (1) a switch 202 which, in conjunction with the switch 196, controls current direction in the torquer field and (2) a switch 204 which, functions symmetrically with the switch 198, controls the actuation of the opposite programming coil 186.

Another portion of the field logic is a zero current dropout coil 206, 208 associated respectively with the programming coils 186, 188. The dropout coils also control the actuation of their respective ganged switch pairs and function to hold them in their "energized" state as long as current is flowing in the dropout coil to preclude mode switching while heavy torquer currents are flowing.

The torquer 28 further comprises an armature assembly 210 which, in this example, is of the character to be series connected with its field winding 200.

An "ignition" control 212 is coupled to the battery assembly 44 as follows: An actuating coil 214 bypassed by a diode 216 is connected at one terminal to the ground bus 122 and at the other terminal to a tap 218 on the battery assembly 44 through a power current overload cutout relay 220, an overspeed, overvoltage dropout relay 222, the manual selector switch 178, and a key "ignition" switch 224. Once energized, the ignition control bypasses the manual selector 178 by the switch 226 thusly to continue its contactor function even though the manual selector is moved away from its mandatory initial state of "neutral." The current overload cutout relay 220 responds from a current or temperature sensor 227; while the overvoltage overspeed cutout relay 222 responds to excess battery voltage as seen by the terminals of a sensing coil 229. Current sensitive fuses may be employed, through conventional considerations of safety and circuit protection, as at 231, 233, 235.

The primary contacts of the ignition control relay are (1) a switch 228 which connects the battery assembly terminal 120 to the power control module 100 and (2) a switch 230 which connects the tap 218 to the lower voltage B+ bus 194 for supplying operating power to the various electronic and other control networks of the system. A blocking buffering diode 232 may be interposed as shown in the bus 194, and filter capacitance therefrom to ground may be connected as indicated at 234.

The clock pulse generator 102 is of the character to provide a substantially constant frequency series of pulses in a free-running mode, so long as the lockout network 154 and the switch 230 enable the application of an operating B+ voltage, typically of the order of 24 volts, to the supply bus 194. A capacitor 236 acts as a noise filter while an RC circuit consisting of a resistor 238 and a capacitor 240 determines the frequency of the clock which in practical examples of the invention is typically approximately one kilohertz due to design considerations and limitations involving the SCR's 124, 114. A resistor 242 tends to stabilize the clock frequency particularly as against ambient temperature excursions. A unijunction transistor 244 in cooperation with its input RC circuit 238, 240 operates as a relaxation oscillator whose output signal drives a transistor 246 which, in turn, triggers a PNP transistor 248 "on" to deliver power to a pulse transformer 250 via a limiting resistor 252. A damper resistor 254 tends to suppress any oscillation caused by distributed capacitance and leakage inductance associated with the pulse transformer. The secondary winding of the transformer is coupled by one terminal to the gate electrode of the commutating SCR 124 while the other terminal is coupled to the cathode of SCR 124. The output pulse turns the commutating SCR "on" and a diode across the pulse transformer output winding absorbs the inductive "kick" energy while assuring that no deleterious negative voltage will develop across the SCR 124 gate to cathode circuit.

The variable time pulse generator 104 may be quite similar to the constant frequency clock except that the frequency of the generator 104 is variable over approximately, typically, an effective 18 to 1 band and allows, as discussed below, a "duty cycle" for the SCR 114 of from approximately 5 percent to 90 percent. It should also be noted, however, that the system is capable of retarding the firing angle to zero thusly providing zero power conductance and a continuously variable duty cycle throughout the range of zero to one.

The adjustment of time at which the pulser 104 supplies a pulse, for turning the power SCR 114 back "on," is accomplished by varying the impedance of a transistor 256 through which the rate determining capacitor 258 is charged. A separate shunt path for discharge or limited charging of the timing capacitor 258 is via a transistor 260. In any event, when the critical emitter voltage for unijunction 262 on the capacitor 258 is reached, the unijunction transistor 262 is triggered sending, as described in connection with the constant frequency clock 102, a pulse to the gate electrode of the power SCR 114 via a pulse transformer 264, energized by a PNP transistor 266 which is, in turn, fired by a transistor amplifier 268 interposed in cascade relation between the unijunction transistor 262 and the PNP transistor 266. The magnitude of the critical voltage for triggering the unijunction transistor 262 is determined by its inherent characteristic called the stand-off ratio. The impedance in the charge path for the capacitor 258 through the transistor 256 is controlled by command from the operator's pedal 270 in the velocity/acceleration manual control 106. A potentiometer 272 is controlled by displacement of the foot pedal 270. The midpoint, in this example, of the potentiometer 272 is connected to the B+ bus 194 while its extreme terminals are symmetrically connected to the ground bus 122 through resistors 274, 276, respectively. Accordingly, the further the excursion of the potentiometer tap from its midpoint, the less the impedance in the circuit of the transistor 256 and hence the smaller the period for the capacitor 258 to charge to its critical value.

Similarly, the transistor 260 also affects the charge on the timing capacitor 258. Its effect is opposite to that of the transistor 256 in that the transistor 260 tends to discharge the capacitor 258 thusly delaying the firing of the unijunction transistor 262. There are, in this example, three sources of input signal to the control electrode of the transistor 260 tending to increase its conductance and discharge the timing capacitor 258. The first of these is the synch signal from the pulse transformer 140 which is supplied through a blocking diode 278 and a sensitivity control resistor 280. The synch signal occurs each time the SCR 114 is commutated "off" and is preferably sufficient to cause a substantially total discharging of the capacitor 258.

A second control signal is supplied as an overvoltage signal comparator 282; and a third signal is an overcurrent signal from the overcurrent detector network 166. Both or either of such signals are impressed upon the base electrode of the transistor 260.

The overvoltage detector includes essentially a differential amplifier transistor 286, one base of which is coupled to the armature 210 output terminal and the other of which is coupled to the battery terminal 218.

Similarly, the overcurrent detector includes a differential amplifier 288 the control or base electrodes of which are coupled across the current sensor element 164.

Additional contacts, digital in character, are actuated responsive to the displacement or position of the foot pedal control 270. A switch 290 connects the B+ bus 194 to the mode switch actuator 170 whenever, in this example, the foot pedal is more than halfway depressed; a switch 292 shorts out the base to emitter circuit of the impedance transistor 256 when the foot pedal is at the midway, mode changing position; and a switch 294 closes the override relay 152 to provide a 100 percent duty cycle in drive mode when the pedal is depressed all the way as for passing and otherwise for maximum motor output.

In operation, the quiescent position of the pedal 270 constitutes a regenerative mode with maximum duty cycle; however, initially there is no power to the power transfer module 100, the commutating capacitor 126 is not charged, and the lockout network 154 precludes oscillation of the clock and variable pulse generators. When the operator depresses the pedal to the midway point, the switch 290 closes and activates the mode switch 108 to reverse the state of the switches 156, 158, 160, 162 from their "regenerative" mode, as shown, to their "drive" mode. It may be noted that the switch 290 can only complete this actuation circuit if a switch 296, actuated by the programming coil 186, and its zero current drop out coil 206, is closed, that is, when there is no current flowing in the SCR and torquer circuits.

When the mode switch 100 transfers, power becomes available to the power control 100; and the lockout network permits the clock and variable pulse generator to oscillate. As the pedal 270 is further depressed, the signal from the potentiometer 272 to the time control transistor 256 becomes more negative and the pulser fires earlier with respect to the clock thusly shortening the "off" time, increasing the duty cycle of the SCR 114 and the transfer of power to the torquer.

When the pedal 270 passes through the midpoint, the mode switch portion 162 transfers to "drive," the field logic switch 202 is activated, and the system is interlocked in the drive mode so long as there is current flowing in the power circuit. The interlocking may be implemented by a normally open auxiliary switch contact 298 and a normally closed switch contact 300, both actuated by the programming coil 188.

When the operator releases the foot pedal, the power delivered to the torquer 28 decreases toward zero. At zero torquer current, the programmer coil 188 snaps to its deenergized state and allows the mode switch 108 and the programmer coil 186 switches to close, thusly reversing the polarity of the torquer field winding 200 and initiating regeneration. Once the programmer coil 186 is actuated, it is interlocked via its current coil 206. Also, the switch 296 and a normally closed switch 302 also actuated by the programming coil 186 insures that the mode switch 108 will remain in "regenerative" and that no signal voltage will be available on the "drive" portion of the potentiometer 272.

The switch 292 shorts the accelerating rate capacitor 304 in the base circuit of the transistor 256 every time that the foot pedal goes through the center of the potentiometer 272 to insure that the power flow will rise at a low, smooth rate thusly preventing torque development discontinuities and any resulting deleterious jerking of the mechanical systems.

As stated earlier, the timing capacitor 258 is discharged through the transistor 260 by the synch signal on the lead 148 each time the power SCR 114 is commutated off. This insures that the SCR 114 will remain off for exactly the time specified by the operator. It also increases the reliability of operation by start-timing only after the SCR 114 has been commutated off and permits a duty cycle approaching 100 percent. In this manner the variable pulse generator 104 is slaved to the clock pulser, and the count time of the variable pulser is initiated when the SCR 114 is turned off. When the count time is short, that is, when the impedance presented by the PNP transistor 256 is low, the SCR 114 is turned back on earlier in the cycle and the duty cycle will be higher. The converse occurs when the count time is high.

In an overall view of the time ratio power control network 100, it may be understood that the SCR 114 is "on" initially and SCR 124 is turned on by the clock pulse. This results, a short time later, in both SCR's being commutated off and the variable pulse generator 104 being reset by discharge of the timing capacitor 258. When the capacitor 258 is again charged, a pulse output is developed and the SCR 114 is turned back on to remain on until commutated off again by operation of the clock pulse on the gate of the commutating SCR 124.

In more detail, when power is initially applied, by transferring the mode switch 108 to "drive," the commutating capacitor 126 is charged through the torquer via the inductor 134 and the diode 136 when the programmer coil 188 is actuated. As soon as capacitor 126 is charged, the clock and variable pulse generators 102, 104 begin oscillating resulting in the SCR 114 being turned on by a pulse from the pulse transformer 264 of the variable time pulse generator 104. In the drive mode, power then flows from the battery 44 through the mode switch 108 (switches 156, 158 thereof), the switch 202 in the field logic network 184, the torquer field winding 200, and the interlocking switch 196 into the torquer motor armature 210.

At one millisecond intervals, in this 1 kilohertz clock example, the constant frequency pulse generator 102 turns the commutating SCR 124 on. The capacitor 126 discharges through the SCR 124, the inductor 130, and the diode 128. When this LC combination has oscillated 180°, the voltage across the capacitor 126 is equal to the supply voltage. The voltage across the saturating inductor 132 drives it into negative saturation. As soon as the inductor 132 saturates, the voltage of the capacitor 126 is impressed across the SCR's 114, 124 causing them to be negatively biased by a voltage approximately equal to the supply voltage. This turns both SCR's (note that the SCR 124 may be already off) off causing the load current through the motor inductance to continue circulating, through the flyback diode 177. The capacitor 126 is clamped to the ground bus through the diode 150; and the diode 177 "charges" again to the supply voltage. After the operator-controlled time delay period, the variable time pulse generator turns the SCR 114 back on and power again flows from the battery to the motor.

It is to be noted that the same time ratio power control module 100 is used for drive and regenerating modes of operation. The duty cycle controls operate in the same manner for either mode and are, as indicated previously, designed to function in this example symmetrically from the position of the potentiometer 272 of the manual foot pedal control 106 with respect to its midpoint. In the regeneration mode, however, it should be understood that when the SCR 114 is turned on, the generator current flows through the bus 112 back to the generator thusly building up relatively large energy magnitudes in the armature and field inductances, that is, "charging" them. Then, as the SCR 114 is opened, or commutated "off," the energy thusly stored is pushed into the battery through the diode 118. Furthermore, the network parameters including inductances and time constants are selected within the design period limits whereby the longer the current is permitted to build up in the generator inductance, the greater the magnitude of energy per cycle that is pumped into the battery. Of course the angular velocity of the armature is an important instantaneous parameter, and it must also be realized that the current rise in the armature is a function of that in the field 200. Hence, since, in this example, the two are in series, a regenerative exponential effect occurs of which significant advantage in accordance with the principles of the invention is made.

Again, in more detail, in switching to the regenerative mode, a signal from the operator pedal 106 activates the programmer switches 196, 198, deactivates the programmer switches 202, 204, and reverses the state of the mode switch 108. These changes occur if and when the "drive" load current has decayed to zero in the zero dropout coil 208 and provided that the commutating capacitor 126 is charged. The SCR 114 connects the torquer field, polarity reversed with respect to its connection in the "drive" mode, to the system return bus 122. In other words, the field logic network 184 orients the field so that the desired polarity of the counter EMF is obtained irrespective of whether the system is in its drive or regenerative mode. Initial voltage across the rotating "generator" armature is caused by the action of residual, tickler, or some permanent flux means.

The current flowing through the field 200 via the SCR 114, when it is turned on, causes the desired magnetic energy storage in the field winding 200. When the SCR 114 is commutated off, the energy thusly stored must, if equilibrium is to be maintained, be discharged. Accordingly, the voltage across the torquer inductances rises to a level higher than the battery by the amount of drop across the diode 118 as current is pumped into the battery. During this portion of the cycle, the commutating capacitor 126 is recharged almost instantaneously, and the system is ready for the next cycle.

As indicated earlier, the switch contacts 160 of the mode switch 108 effectively short out a portion of the current sensing element 164, when the system is in the drive mode. The purpose of this sensitivity control is to increase the level at which the control function of the overcurrent detector 166 starts to limit the output current. In the drive mode the current limit is selected typically to be three times rating, while in the regenerative mode the torquer rating itself is chosen as the limit.

Again, it may be noted that the contactors of the field logic programming coils are interlocked to insure against spurious racing; and the auxiliary contacts 296, 302 and 298, 300 preclude mode transfer except under quiescent conditions. It is to be noted in this general area of the description of the system that the overvoltage limited 282 acts to preclude the non-equilibrium condition of the regenerating torquer developing a voltage higher than that of the combination of the battery and diode 118 which could result in a run-away control condition.

Speeder control

Figure 5:
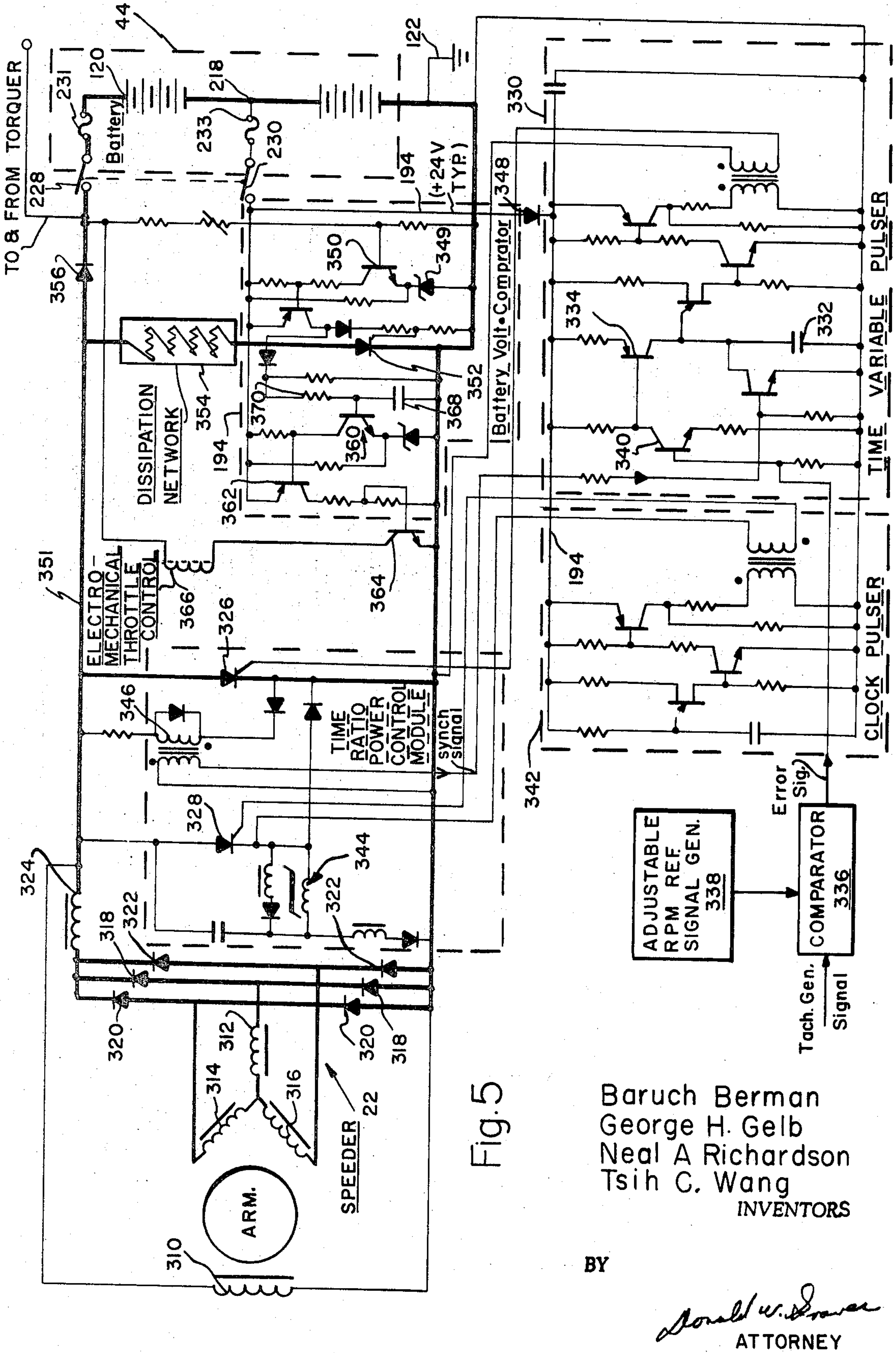
FIG. 5 is a schematic diagram of an example of speeder and speeder control apparatus in accordance with the invention.

The primary functions of the speeder 22, see FIGS. 1 and 5, as indicated earlier, include (1) presenting to the prime mover engine 2 through the power divider gear mechanism, a rotational velocity controlling reaction torque and (2) utilizing any torque presented to the speeder to generate and deliver electrical power to the battery bus or, in some cases, to the torquer 23.

The engine throttle is, in general, set at a substantially fixed position to provide a constant power output at a constant r.p.m. The controls for the magnitude of reaction torque developed and the electrical power generated are, in several important aspects, substantially identical to those of the torque controller 42 already discussed in detail hereinabove. It is stressed, in this connection, however, that in overall function the speeder controller does not switch between regenerative and motor modes. Hence, mode switching is not included in the speeder controller; and it may be considered that the speeder is always, at least potentially, in a regenerative mode.

It may again be noted that, through the gear kinematics of the planet carrier gear, the rotational velocity of the speeder will be *maximum* when the rotational velocity of the output shaft 18 is zero or minimum and will zero or *minimum* when that of the shaft is maximum.

The speeder control network 40 includes, in this example, an electronic reference speed signal generator the output signal of which is compared with that from a rotational speed signal generator 36 coupled to the engine output shaft. The differential signal is then utilized in the speeder control network to effect the desired reaction torque for maintaining the r.p.m. of the engine. The speeder reaction torque magnitude is determined by the electrical load seen by the rotating electric generator in the speeder; and the effective electrical load is controlled by a time ratio electronic power control module which may, as mentioned above, be substantially similar to that, 100, of the torquer controller 42. For example, if the engine r.p.m. tends to diminish, the effective duty cycle of the speeder power control module is decreased thereby lessening the speeder torque and hence the load seen by the engine, thereby tending to increase, in a corrective manner, the engine r.p.m. If, on the other hand, the engine speed increases, the speeder power control module increases the electric load on the speeder and, in turn, on the engine. The engine r.p.m. consequently diminishes until a minimum or zero error exists between the electric reference and the engine mounted signal generator 36.

Referring particularly to FIG. 5, an example of a speeder 22, a speeder control network 40, and their structural relation with the main battery 44 is illustrated.

The speeder 22, designed to operate, in this example, over an r.p.m. range of the order of 1000 to 10,000 may typically be an AC machine having a field winding 310, and a three-phase armature winding 312, 314, 316 each terminal of which is associated with a full wave doubler, rectifier/pair 318–318′, 320–320′, 322–322′, respectively. The diode pairs constitute, in this example, three phase power rectifier bridge. The resulting combined current through an inductance 324 contains ripple of the order of 4 percent or less and may in practice be ignored; and a voltage output substantially proportional to speeder rotational velocity is developed. Since the reaction torque is proportional to the product of armature current and gap flux, the reaction torque may be determined linearly by the armature current by causing the speeder field 310 to be operated in a saturated condition. Furthermore, the saturated field minimizes changes in air gap flux magnitudes due to temperature induced field resistance changes, as well as changes in armature reaction, gap variations due to differential thermal expansion of rotor versus stator, and other such affecting conditions.

Interposed between the speeder generator and its load battery 44 is a time ratio power control module which, again, may be considered substantially identical to the power control module 100 of the torquer controller 42 operating in the regenerative mode, described in detail above: A power SCR 326 is commutated "off" by a commutating SCR 328 and then turned back on by a controlled delayed pulse from a variable time pulser 330; the intervening delay being determined by the charge rate of a timing capacitor 332 as determined by the effective impedance of a PNP transistor circuit 334. The operation of the impedance circuit is controlled in turn by the error signal from a comparator network 336. The latter examines the algebraic difference between the signal from a reference standard 338 and a signal from the engine mounted signal generator 36 coupled to the engine 2 and couples the resultant error signal through an amplifier 340 to the transistor circuit 334, thusly shortening or lengthening the "off" period for the SCR 326 and increasing or decreasing the coupling from the generator to the battery thereby, in turn, increasing or decreasing the mechanical load presented by the speeder to the engine 2.

Also as in the torquer controller example, the commutating SCR 328 is turned "on" by a periodic, 1 kilohertz typically, pulse from the clock pulser 342, and both SCR's 326, 328 are commutated "off" by the commutating network 344. A synchronizer pulse generated in the pulse transformer circuit 346 "resets" the variable time pulser 330 each time the SCR's are commutated off.

As in the regenerative mode of the torquer controller 42, the inductive energy storage technique is utilized for the operation of the speeder and controller of FIG. 5. In this manner voltages of more than 200 volts are readily achieved for charging of the battery 44. Accordingly, the battery voltage may be of the order of 200 volts and it may be lead-acid or nickel-cadmium in character. A battery voltage comparator network 348 senses the total battery voltage and, in this example, may perform either or both of two additional controls when the battery voltages becomes excessively large indicating deleteriously excessive charging rates of storage therein. By comparing the average battery voltage with a Zener diode 349 based reference potential at the transistor amplifier 350, and, when excess charge is indicated, a power SCR 352 is turned on to shunt each cycle of the speeder output energy through a dissipation network 354.

It is to be noted that as the power SCR 326 conducts during each cycle, the potential of the power bus 351 is clamped to ground causing the SCR 352 to be commutated off. Hence, the SCR 326 serves in the dual role of a power, voltage boosting network switch while at the same time providing cyclic commutating of the SCR 352.

It may then be turned on again, in each cycle, by the same control signal from the amplifier 350 if the state of overcharge still exists.

If overcharge of the battery 44 persists for an undesirably long period of time in spite of the dissipating effects of the network 354, a Zener referenced amplifier 360 is turned on, causing, in turn, a control signal amplified by a circuit 362 to turn on amplifier 364. The collector current of the transistor 364 is drawn from the battery through an electromechanical throttle control 366 of the prime mover engine 2. Upon the occurrence of this chain of events, the engine may be throttled back to, for example, an "idle" or quiescent state. The period of such "idle" state is determined by the voltage on the timing capacitor 368 connected to the control electrode of the Zener referenced amplifier 360. The magnitude of charge on the timing capacitor 368 flows through the timing resistor 370 and is controlled by the voltage at the top 218 of the battery 44. When the battery voltage is deleteriously high and remains so for a period comparable to the RC time of the timing capacitor 368 and resistor 370, the indicated change of state of the Zener referenced amplifier 360 occurs. Furthermore, it may be noted, the conduction of the amplifier 360 continues until the accumulated charge on the timing capacitor 368 causes its voltage to assume a predetermined critical voltage and thereby return the amplifier to its initial state.

A similar control to the prime mover throttle may be provided, when desired, for increasing the engine r.p.m. when the battery voltage is undesirably low for more than a predetermined period of time. The control network, now shown, may be quite like that of the circuit 194 except that its input is adapted for detecting an abnormally low battery voltage; and its output is of the character to move the throttle position a predetermined amount to increase the engine r.p.m.

What is claimed is:

1. A power train comprising:

a prime mover;

a speeder, said speeder being dynamically coupled to said prime mover and adapted to control the speed and torque output of said prime mover, said speeder further being adapted to receive energy from said prime mover and to transfer said energy in a different form;

a speeder controller, said controller having means to sense the power output of said prime mover, said controller being adapted to control the power output of said speeder whereby to maintain the power output of said prime mover substantially constant;

energy storage means, said storage means being adapted to receive and store energy from said speeder;

energy receiving means;

energy transmission means adapted to receive energy from said prime mover and to transfer said energy to said energy receiving means;

a torquer, said torquer being dynamically coupled to said energy receiving means and being adapted to receive energy from said energy receiving means and to transfer energy to said energy storage means and further being adapted to transfer energy from said energy storage means to said energy receiving means upon demand of said energy receiving means; and a torquer controller, said torquer controller being adapted to receive and correlate the energy demands of said energy receiving and storage means whereby to control the energy transfer state of said torquer.

2. A power train according to claim 1 wherein said prime mover comprises an internal combustion engine.

3. A power train according to claim 1 wherein said speeder comprises an electric generator.

4. A power train according to claim 1 wherein said torquer comprises an electric motor generator.

5. A power train according to claim 1 wherein said energy storage device comprises a battery.

6. A power train according to claim 3 wherein said energy receiving means comprises at least one driving wheel on said vehicle.

7. A power train according to claim 6 wherein a brake is provided for said speeder, said speeder control means being adapted to actuate said brake to stop said speeder when said driving wheel reaches a predetermined speed.

8. A power train according to claim 7 and further including a throttle for said prime mover, said throttle being adapted to increase the energy output of said prime mover when said driving wheel exceeds said predetermined speed.

9. A power train according to claim 4 wherein said electric motor generator has a permanent magnet field.

10. A power train comprising:

a prime mover;

a speeder, said speeder being dynamically coupled to said prime mover and adapted to control the speed and torque output of said prime mover, said speeder further being adapted to receive energy from said prime mover and to transfer said energy in a different form;

a speeder control, said controller having means to sense the energy output of said prime mover, said controller being adapted to control the energy output of said speeder whereby to maintain the energy output of said prime mover substantially constant;

energy storage means, said storage means being adapted to receive and store energy from said speeder;

energy receiving means;

energy transmission means adapted to receive energy from said prime mover and to transfer said energy to said energy receiving means;

a torquer, said torquer being dynamically coupled to said energy receiving means and being adapted to receive energy from said energy receiving means and to transfer energy to said energy storage means and further being adapted to transfer energy from said energy storage means to said energy receiving means.

11. A power train according to claim 10 wherein said prime mover comprises an internal combustion engine.

12. A power train according to claim 10 wherein said speeder comprises an electric generator.

13. A power train according to claim 10 wherein said torquer comprises an electric motor generator.

14. A power train according to claim 10 wherein said energy storage device comprises a battery.

15. A power train according to claim 12 wherein said energy receiving means comprises at least one driving wheel on said vehicle.

16. A power train according to claim 15 wherein a brake is provided for said speeder, said speeder control means being adapted to actuate said brake to stop said speeder when said driving wheel reaches a predetermined speed.

17. A power train according to claim 16 and further including a throttle for said prime mover, said throttle being adapted to increase the energy output of said prime mover when said driving wheel exceeds said predetermined speed.

18. A power train according to claim 13 wherein said electric motor generator has a permanent magnet field.

19. A power train according to claim 10 and further including a torquer controller, said torquer controller being adapted to receive and correlate the energy demands of said energy receiving and storage means whereby to control the energy transfer state of said torquer.

20. A method of operating a power train having a prime mover, a speeder dynamically coupled to said prime mover and adapted to control the energy output of said prime mover and to transfer energy therefrom to an energy storage device, an energy receiving means connected by transmission means to said prime mover, a torquer for transmitting energy to and from said energy receiving means from and to said energy storage means, sensing and control means for said speeder and for said torquer which comprises;

sensing the power output of said prime mover and controlling said speeder so as to maintain the energy output of said prime mover substantially constant;

sensing the power demands of said energy receiving means and said energy storage means whereby to determine the direction and magnitude of the power passing through said torquer.

21. A method according to claim 20 and further comprising stopping energy from passing through said speeder when said energy receiving means reaches a predetermined speed.

22. A method according to claim 21 and further comprising increasing the power output of said prime mover when said energy receiving means passes said predetermined speed.

23. A power train system of the character requiring a predetermined time-averaged magnitude of power for the operation thereof, the system comprising:

prime mover means for providing mechanical power output at least equal to said predetermined magnitude;

prime mover power control means coupled to said prime mover means for determining the instantaneous rate of mechanical energy output thereof;

electric generator speeder means of the character to receive mechanical input power and generate electric power responsive thereto while reflecting a reactance torque of predetermined magnitude;

output shaft means for delivering mechanical power;

mechanical power divider means coupled to said prime mover for receiving its said power output and transmitting it selectively to said speeder and output shaft means and being of the character to transmit a desired instantaneous magnitude of demand power to said output shaft means while transmitting the prime mover output power in excess thereof to said speeder means;

prime mover power output sensor means for providing a rate signal representative of said power output;

speeder control means coupled to said sensor means for controlling the magnitude of said reactance torque reflected to said powed divider means and the magnitude of the generated said electric power responsive to said rate signal;

energy storage means coupled to said speeder generator means for receiving and storing energy therefrom;

electric torquer means coupled bidirectionally to said output shaft means in a manner to permit selectively the derivation, as a generator, and delivery, as a motor, of mechanical power therefrom and thereto, respectively;

torquer controller means coupled to said torquer means and to said storage means and including operator input control signal means for selectively coupling said torquer means unidirectionally as a charging generator to said storage means when said output shaft means is transmitting more power than instantaneously desired and, reciprocally, for coupling said storage means unidirectionally to said torquer means as a motor when said output shaft means is transmitting less power than instantaneously desired.

24. The invention according to claim 23 in which said energy storage means comprises storage battery means.

25. The invention according to claim 24 in which said torquer controller means includes time ratio, duty cycle power flow control means characterized by being intercoupleable between said battery means and said torquer means and being of the character to achieve the last indicated coupling repetitively in a predetermined cycle the period of which is time divided to provide coupling versus isolation of said battery and torquer means in a duty cycle proportion relation, the magnitude of said duty cycle portion being substantially controlled by signals impressed thereon through said operator input control signal means.

26. The invention according to claim 25 in which said torquer controller means further includes mode switch means coupled to said torquer and said power flow control means and being substantially responsive to said operator input control signals for determining the motor versus regenerative modes of operation of said torquer and the sense of electrical energy flow between it and said storage battery means.

27. The invention according to claim 25 in which said operator input control signal means is of the character to cause said time ratio power flow control means to achieve a larger said duty cycle of coupling when the demand, by the operator, is for greater power to said output shaft means as well as when said demand is for greater power to be derived from said output shaft means.

28. The invention according to claim 27 in which said operator input control signal means comprises transducer means for converting operator signals to signals for controlling said coupling duty cycle, said transducer means being of the character to provide electrical output duty cycle control signals which in amplitude are symmetrically distributed about a crossover point representative of a null control status relationship between demand for motor mode versus demand for regenerative mode, said crossover point being adjacent to points of minimum demand and at maximum displacement from maximum demand for power delivery between said battery and torquer means.

29. The invention according to claim 26 in which said torquer means includes inductance means and in which said torquer controller means includes current bus means coupled to said torquer means and to said time ratio power flow control means and connection means, coupled to said current bus means, of the character actuated by said time ratio power flow control means to return, during a predetermined portion of each of said cycle periods, current generated by said torquer means substantially directly through said torquer inductance current energy storage means.

30. The invention according to claim 29 in which said time ratio power flow control means is of the character to provide that said predetermined portion of each of said cycle periods is substantially time coincident with the duty portion of said cycle period.

31. The invention according to claim 30 in which said time ratio power flow control means is further characterized by means providing coupling of said generated current to said battery means during a portion of each of said cycle periods which is substantially time coincident with the off-duty portion of said cycle period.

32. The invention according to claim 27 which further includes duty cycle control means coupled to said time ratio power flow control means and comprising clock means for generating a substantially constantly repetitive timing signal and variable timer means for generating a duty cycle control timing signal which is controllably variably delayed with respect to said clock timing signal.

33. The invention according to claim 32 in which said time ratio power flow control means is characterized by means for achieving said duty cycle the magnitude of which is substantially proportional to the magnitude of delay between said clock timing signal and said variable timer signal.

34. The invention according to claim 32 in which said time ratio power flow control means includes electrically controlled power current switching means of the character capable of carrying substantially all current between said battery means and said torquer means and to be switched substantially fully on and off at least once during each said duty cycle, said electrically controlled switching means having an input terminal for receiving duty cycle control timing signals.

35. The invention according to claim 34 in which said time ratio power flow control means includes commutating network means for generating a periodic signal for commutating to an off state said electrically controlled power current switching means responsive to said clock repetitive timing signals at a predetermined commutating time subsequent thereto.

36. The invention according to claim 35 in which said variable timer means includes reset means coupled to said commutating network means for defining, coincident with the commutating off of said switching means, the start of each said off-duty portion of said duty cycle with respect to which said variable timer duty cycle control timing signal is controllably variably delayed for determining, in turn, the time length of said duty portion of said duty cycle, said variable timer means being coupled to said input terminal of said electrically controlled power current switching means for impressing thereon said duty cycle control timing signal from said variable timer means for returning said switching means to its on state after the said controlled variable delay time, after its being commutated off by said commutating network means.

37. A power train comprising:

a prime mover, said prime mover having control means to vary speed and torque output, a speeder, said speeder being dynamically coupled to said prime mover and adapted to control the speed and torque output of said prime mover, said speeder further being adapted to receive energy from said prime mover and to transfer said energy in a different form;

a speeder controller, said controller having means to sense the energy output of said prime mover, said controller being adapted to control the energy output of said speeder whereby to maintain the energy output of said prime mover substantially constant;

energy storage means, said storage means being adapted to receive and store energy from said speeder;

energy receiving means, energy transmission means adapted to receive energy from said prime mover and to transfer said energy to said energy receiving means;

a torquer, said torquer being dynamically coupled to said energy receiving means and being adapted to receive energy from said energy receiving means and to transfer energy to said energy storage means and further being adapted to transfer energy from said energy storage means to said energy receiving means upon demand of said energy receiving means; and a torquer controller, said torquer controller being adapted to receive and correlate the energy demands of said energy receiving and storage means, whereby to control the energy transfer state of said torquer, said torquer controller further being adapted to actuate said prime mover control means whereby to vary the energy output of said prime mover in response to a predetermined energy demand of said energy receiving means.

38. A power train according to claim 37 and further including sensor means to sense the amount of energy stored in said energy storage means, and further including control means to vary said prime mover control means in response to the amount of energy stored in said energy storage means.

39. A power train according to claim 37 in which said energy receiving means comprises at least one wheel, said torquer controller being adapted to actuate said prime mover control means whereby to increase the energy output of said prime mover in response to said wheel exceeding a predetermined speed.

40. A power train according to claim 37 and further including a second energy receiving means adapted to receive energy from said energy storage means when the energy stored exceeds a predetermined energy level.

References Cited

UNITED STATES PATENTS

| | | | |
|---|---|---|---|
| 707,230 | 8/1902 | Henry | 74—675X |
| 948,436 | 2/1910 | Thomas | 74—675X |
| 968,290 | 8/1910 | Thomas | 180—65UX |
| 1,081,643 | 12/1913 | Wills | 74—686X |
| 1,332,631 | 3/1920 | Morse | 60—6X |
| 1,442,908 | 1/1923 | Ripley | 74—686X |
| 1,515,322 | 11/1924 | Ahlm | 74—686 |
| 1,671,033 | 5/1928 | Kimura | 290—14 |
| 2,538,299 | 1/1951 | Dewandre | 74—675X |
| 2,666,492 | 1/1954 | Nims et al. | 180—65 |
| 3,211,249 | 10/1965 | Papst | 180—65 |

CARLTON R. CROYLE, Primary Examiner

T. C. PERRY, Assistant Examiner

U.S. Cl. X.R.

74—675, 686; 180—65; 290—14